(12) United States Patent
Mizuno et al.

(10) Patent No.: US 11,276,378 B2
(45) Date of Patent: Mar. 15, 2022

(54) VEHICLE OPERATION SYSTEM AND COMPUTER READABLE NON-TRANSITORY STORAGE MEDIUM

(71) Applicant: DENSO CORPORATION, Kariya (JP)

(72) Inventors: Wataru Mizuno, Kariya (JP);
Kazutomo Tsuchikawa, Kariya (JP);
Daisuke Suzuki, Kariya (JP);
Yoshinori Watanabe, Kariya (JP);
Taiichiro Ichimaru, Kariya (JP);
Daisuke Namekawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 487 days.

(21) Appl. No.: 16/325,598

(22) PCT Filed: Jun. 29, 2017

(86) PCT No.: PCT/JP2017/023968
§ 371 (c)(1),
(2) Date: Feb. 14, 2019

(87) PCT Pub. No.: WO2018/042861
PCT Pub. Date: Mar. 8, 2018

(65) Prior Publication Data
US 2021/0280157 A1    Sep. 9, 2021

(30) Foreign Application Priority Data
Sep. 1, 2016   (JP) .............................. JP2016-170813

(51) Int. Cl.
*G09G 5/38*   (2006.01)
*G06T 7/70*   (2017.01)
(Continued)

(52) U.S. Cl.
CPC ............... *G09G 5/38* (2013.01); *B60K 35/00* (2013.01); *G06F 3/013* (2013.01);
(Continued)

(58) Field of Classification Search
CPC .................................... G09G 5/38; G06T 7/70
See application file for complete search history.

(56) References Cited

U.S. PATENT DOCUMENTS

2005/0154505 A1 * 7/2005 Nakamura ........... G01C 21/365
701/1
2014/0125583 A1 * 5/2014 Aoki ..................... B60K 37/02
345/156
(Continued)

FOREIGN PATENT DOCUMENTS

JP    2008162550 A    7/2008
JP    2014094647 A    5/2014
(Continued)

*Primary Examiner* — Yi Yang
(74) *Attorney, Agent, or Firm* — Harness, Dickey & Pierce, P.L.C.

(57) ABSTRACT

A vehicle operating system for controlling a control target device by performing a predetermined operation of a driver on a steering wheel of a vehicle, includes: a visual line position calculator for calculating a visual line position of the driver; a display position calculator for calculating a display position on a display arranged on a far side of the steering wheel from the visual line position of the driver using a calculation result of the visual line position calculator and a position coordinate of the steering wheel, the display position not hidden behind the steering wheel; and a display controller for displaying display information indicating a content of the operation on the steering wheel at the display position.

5 Claims, 9 Drawing Sheets

(51) Int. Cl.
*B60K 35/00* (2006.01)
*G06F 3/01* (2006.01)
*G06K 9/00* (2022.01)

(52) U.S. Cl.
CPC ..... *G06K 9/00221* (2013.01); *G06K 9/00845* (2013.01); *G06T 7/70* (2017.01); *B60K 2370/1529* (2019.05); *B60K 2370/164* (2019.05); *B60K 2370/166* (2019.05); *B60K 2370/167* (2019.05); *B60K 2370/52* (2019.05); *B60K 2370/736* (2019.05); *G06T 2207/30201* (2013.01); *G06T 2207/30268* (2013.01); *G09G 2340/0464* (2013.01); *G09G 2380/10* (2013.01)

(56) References Cited

U.S. PATENT DOCUMENTS

| | | | |
|---|---|---|---|
| 2014/0156107 A1* | 6/2014 | Karasawa | G01C 21/3664 701/1 |
| 2016/0132126 A1* | 5/2016 | van Laack | G06F 3/04842 345/156 |
| 2016/0173568 A1* | 6/2016 | Penilla | H04L 67/10 709/217 |
| 2016/0323722 A1* | 11/2016 | Kovarik | B62D 15/00 |

FOREIGN PATENT DOCUMENTS

| | | |
|---|---|---|
| JP | 2015168264 A | 9/2015 |
| JP | 5909048 B2 | 4/2016 |
| WO | WO-2015037325 A1 | 3/2015 |

\* cited by examiner

VEHICLE OPERATION SYSTEM AND COMPUTER READABLE NON-TRANSITORY STORAGE MEDIUM

CROSS REFERENCE TO RELATED APPLICATIONS

This application is a U.S. National Phase Application under 35 U.S.C. 371 of International Application No. PCT/JP2017/023968 filed on Jun. 29, 2017. This application is based on and claims the benefit of priority from Japanese Patent Application No. 2016-170813 filed on Sep. 1, 2016. The entire disclosures of all of the above applications are incorporated herein by reference.

TECHNICAL FIELD

The present disclosure relates to a vehicle operation system and a computer program.

BACKGROUND ART

A vehicle operation system that controls a control target device by performing a predetermined operation to a steering wheel of the vehicle is suggested. In this type of vehicle operating system, display information (that is, an icon or the like) indicating the content of the operation on the steering wheel is displayed on, for example, a head up display or the like so that the driver can visually recognize it. By visually recognizing the display information and performing a predetermined operation on the steering wheel, the driver can perform, for example, various settings of the audio device and the air conditioner at the periphery of the steering wheel with less visual line movement from the front of the vehicle.

PRIOR ART LITERATURES

Patent Literature

Patent Literature 1: JP-5909048-B2

SUMMARY

In the configuration in which the display position of the display information is fixed, the following objects are assumed. That is, for example, when the driver changes his/her posture during driving due to driving for a long period of time or the like, the visual line of the driver (that is, the position of the eyes) is lowered, and the display information might be hidden behind the steering wheel when seeing from the visual line of the driver. For this reason, when such a situation occurs, it takes much time and effort to change the posture of the driver to visually recognize the display information, which is troublesome. In particular, in the situation where the vehicle speed is relatively fast, it is assumed that the effort of changing the posture may be hesitated.

The present disclosure provides a vehicle operation system and a computer program that provide the driver to appropriately and visually recognize display information indicating the content of the operation on the steering wheel even when the posture of the driver changes, thereby improving convenience for the driver.

According to one aspect of the present disclosure, in a vehicle operation system for controlling a control target device by performing a predetermined operation of a driver on a steering wheel of a vehicle, a visual line position calculator calculates a visual line position of the driver. A display position calculator calculates a display position on a display arranged on a far side of the steering wheel from the visual line position of the driver using a calculation result of the visual line position calculator and a position coordinate of the steering wheel, the display position not hidden behind the steering wheel. A display controller displays display information indicating a content of the operation on the steering wheel at the display position.

The display position on the display not hidden behind the steering wheel is calculated based on the calculation result of the visual line position of the driver and the position coordinate of the steering wheel, and the display information indicative of the content of the operation on the steering wheel is displayed at the display position. Even when the posture of the driver changes, the driver can properly view and recognize the display information indicating the content of the operation on the steering wheel, thereby improving the convenience.

BRIEF DESCRIPTION OF DRAWINGS

The above and other objects, features and advantages of the present disclosure will become more apparent from the following detailed description made with reference to the accompanying drawings. In the drawings.

EMBODIMENTS

Figure 1:
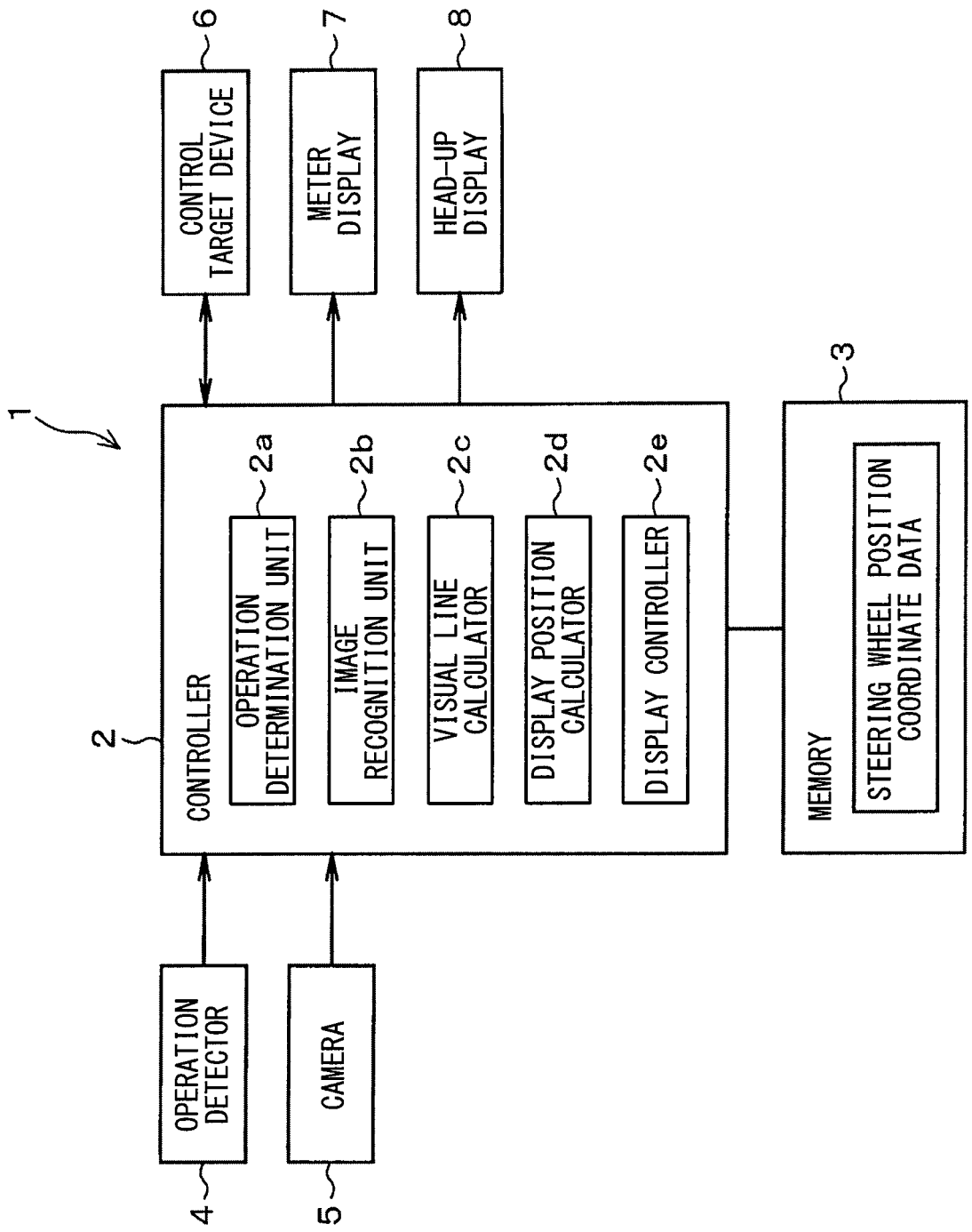
FIG. 1 is a functional block diagram showing one embodiment.

Hereinafter, an embodiment will be described with reference to the drawings. The vehicle operation system 1 includes a controller 2, a memory 3, an operation detector 4, a camera 5 (corresponding to an imaging unit), a control target device 6, a meter display 7 (corresponding to a display), and a head-up display 8 (corresponding to the display).

The operation detector 4 includes an electrostatic sensor arranged in a steering wheel 9 in the vehicle compartment, detects the operation of the driver with respect to the steering wheel 9, and outputs an operation detection signal indicating the operation of the driver to the controller 2. The operation detector 4 may be configured to include any sensor as long as the detector 4 detects the operation of the driver with respect to the steering wheel 9, and may include a configuration with a light sensor, a temperature sensor, a pressure sensor, and the like. The operation performed by the driver on the steering wheel 9 is hitting, sliding, and the like. The camera 5 is disposed so as to capture a range including the face of the driver seated in the driver's seat in the passenger compartment, and outputs a video signal including the captured image to the controller 2.

The camera 5 is, for example, a CCD (i.e., Charge Coupled Device) image sensor, a CMOS (i.e., Complementary Metal Oxide Semiconductor) image sensor, and the like, and may include a single camera or plural cameras.

The control target device 6 is, for example, an audio device or an air conditioner device. When a control signal is input from the controller 2, the control target device 6 performs the control operation specified by the control signal. For example, in a case of an audio device, the control target device 6 adjusts the volume, etc. when inputting a control signal for designating the adjustment of the volume, etc., and in a case of the air conditioner device, the device 6 adjusts temperature, air volume, wind direction, etc. when inputting a control signal for adjusting the temperature, the air volume, the wind direction and the like.

Figure 2:
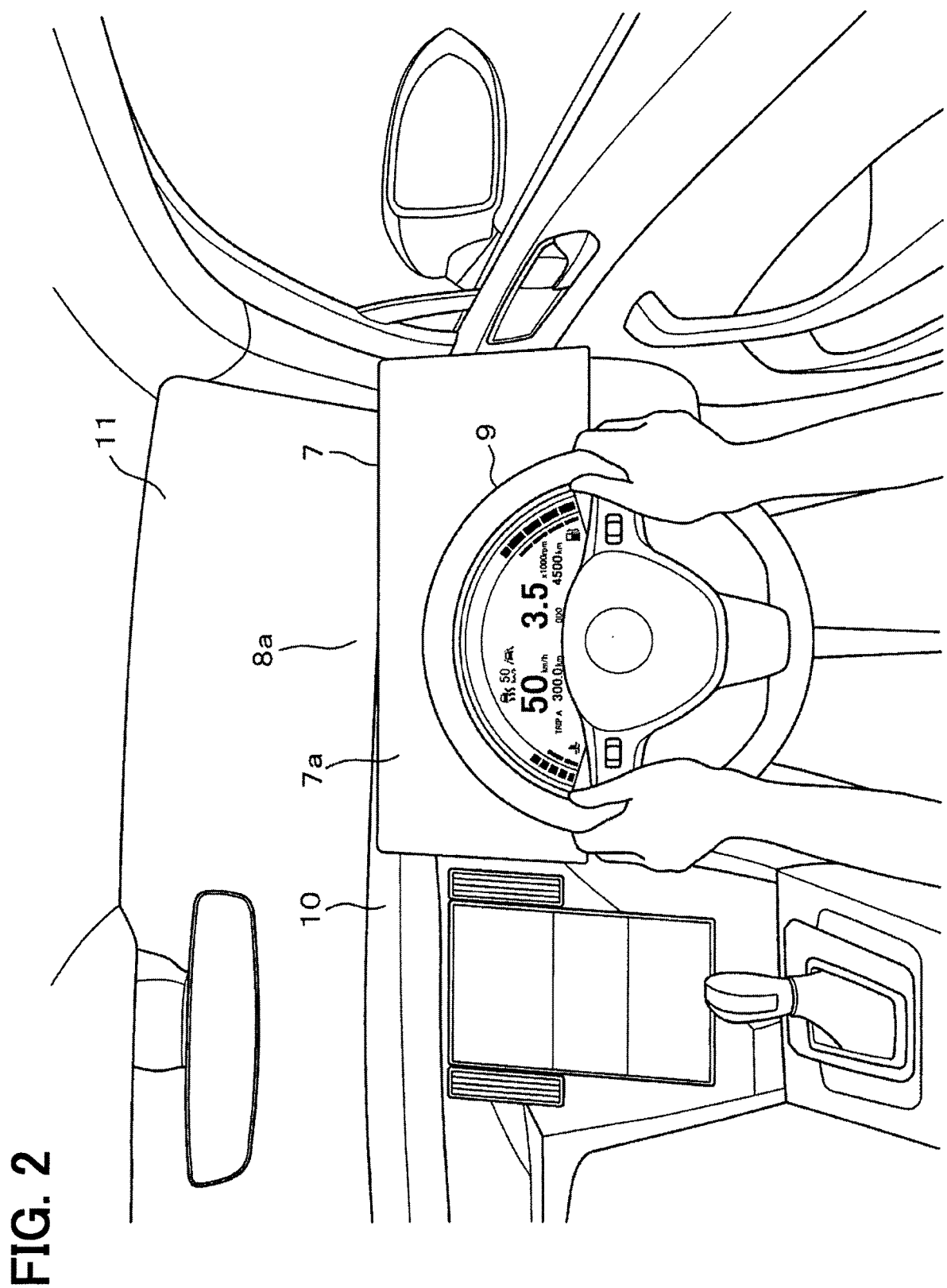
FIG. 2 is a diagram showing a configuration of the periphery of a steering wheel and a meter display.

As shown in FIG. 2, the meter display 7 is arranged between the steering wheel 9 and the dashboard 10 in the passenger compartment, and is disposed on the far side of the steering wheel 9 when seeing from the visual line of the driver. In the meter display 7, most of the planar portion on the side of the steering wheel 9, that is, the planar portion on which the driver can visually recognize is set as the display area 7a. When a display command signal is input from the controller 2, the information designated by the display command signal is displayed in the display area 7a. The information displayed in the display area 7a of the meter display 7 is the vehicle speed, the engine rotation speed, the cumulative travel distance, the fuel amount, the image of the electronic mirror system, and the like.

The head-up display 8 includes a projector for projecting an image. As shown in FIG. 2, the front area of the front window shield 11 right in front of the driver where the image is projected from the projector is a display area 8a. That is, similarly to the meter display 7, the head-up display 8 is arranged on the far side of the steering wheel 9 as viewed from the visual line of the driver. When the display command signal is input from the controller 2, the head-up display 8 displays the information indicated by the display command signal in the display area 8a. The driver can visually recognize the information displayed on the meter display 7 and the head up display 8 by reducing the movement of the visual line from the front of the vehicle.

The controller 2 is constituted by a microcomputer having a CPU (i.e., Central Processing Unit), a ROM (i.e., Read Only Memory), a RAM (i.e., Random Access Memory), and an I/O device (i.e., Input/Output device). The controller 2 executes a computer program stored in a non-transitory tangible storage medium to execute a process corresponding to the computer program, and controls the overall operation of the vehicle operation system 1. The memory 3 holds position coordinate data indicating the three-dimensional position coordinate of the steering wheel 9. That is, when the driver adjusts the position of the steering wheel 9, the memory 3 updates the position coordinate data indicating the three-dimensional position coordinate before adjustment to be the position coordinate data indicating the three-dimensional position coordinate after the adjustment.

The controller 2 includes an operation determination unit 2a, an image recognition unit 2b, a visual line position calculator 2c, a display position calculator 2d, and a display controller 2e. Each of these devices 2a to 2e is constituted by a computer program executed by the controller 2, and is realized by software.

Upon receiving the operation detection signal from the operation detector 4, the operation determination unit 2a determines the operation of the driver with respect to the steering wheel 9 based on the input operation detection signal, and outputs the control signal to the control target device 6 according to the determination result. When determining that the operation of the driver is the adjustment of the volume of the audio device or the like, the operation determination unit 2a outputs a control signal for designating the adjustment of the volume etc. to the audio device. When determining that the operation of the driver is the adjustment of the temperature, the air volume, the wind direction and the like, the operation determination unit 2a outputs a control signal designating the adjustment of the temperature, the air volume, the wind direction, etc. to the air conditioner.

Upon receiving a video signal from the camera 5, the image recognition unit 2b recognizes the image included in the input video signal, and recognizes the image including the face of the driver photographed by the camera 5. The visual line position calculator 2c calculates the face position of the driver using the recognition result of the image recognition unit 2b, and calculates the visual line position (corresponding to the eye position) of the driver.

Using the calculation result of the visual line position calculator 2c and the position coordinate data stored in the memory 3, the display position calculator 2d calculates the display position on the meter display 7 and the head up display 8 not hidden behind the steering wheel 9 in view of the driver's visual line position. The display controller 2e outputs the display command signal to the meter display 7 and the head up display 8, and displays the display information indicating the contents of the operation on the steering wheel 9 on the meter display 7 or the head up display 8 at a position corresponding to the upside of the steering wheel 9.

Figure 3:
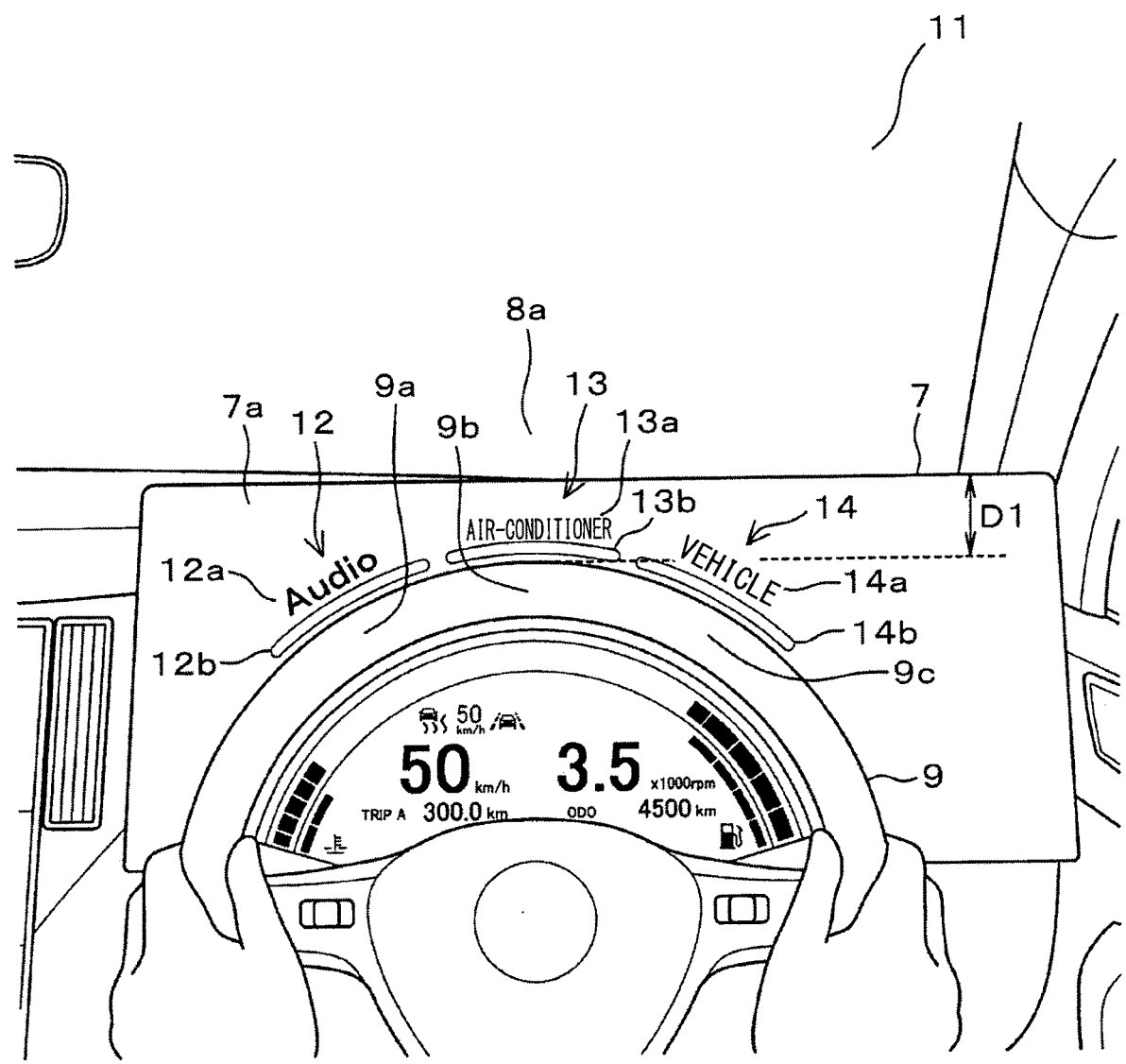
FIG. 3 is a diagram (part 1) showing a display mode of display information.

In the above-described configuration, as shown in FIG. 3, the controller 2 displays the display information 12 (i.e., the character string 12a of "Audio" and the icon 12b) indicating the operation of the audio device, the display information 13 (i.e., the character string 13a of "air conditioner" and the icon 13b) indicating the operation of the air conditioner device, and the display information 14 (i.e., the character string 14a of "vehicle" and the icon 14b) indicating the operation of vehicle control on the meter display 7 at the same time. The controller 2 sets the character string 12a of "Audio" to the upward-sloping string, sets the character string 13a of "air conditioner" to the horizontal string, sets the character string 14a of "vehicle" to the downward sloping string, the icons 12b, 13b, and 14b to have the arc shape, and displays the display information 12 to 14 in a display manner along the shape of the steering wheel 9.

Figure 4:
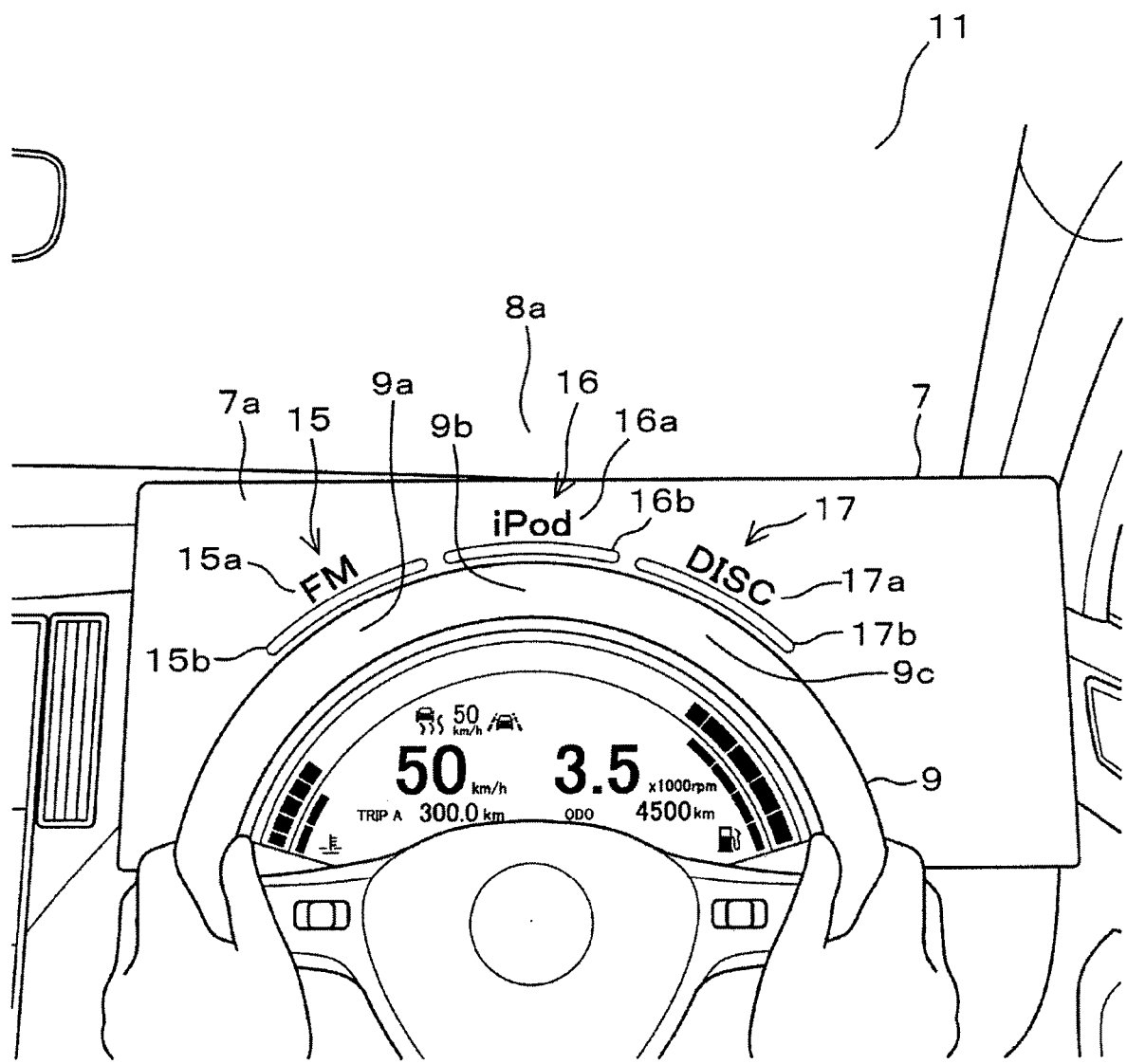
FIG. 4 is a diagram (part 2) showing a display mode of display information.

When the controller 2 determines that the driver hits the periphery around the portion 9a (i.e., a portion along the icon 12b) of the steering wheel 9 corresponding to the display information 12 from the state shown in FIG. 3, the controller 2 determines that the driver selects various settings of the audio device, and switches from the display mode in FIG. 3 to the display mode in FIG. 4. In the display mode of FIG. 4, the controller 2 displays the display information 15 (i.e., the character string 15a of "FM" and the icon 15b) indicating the operation of the FM, the display information 16 (i.e., the character string 16a of "iPod" and the icon 16b) indicating the operation of the iPod (registered trademark), and the display information 17 (i.e., the character string 17a of "DISC" and the icon 17b) indicating the operation of the DISC simultaneously. Also in this case, the controller 2 displays the display information 12 to 14 in a display mode along the shape of the steering wheel 9. After that, the driver can perform various settings of the audio device in a stepwise manner by hitting a portion of the steering wheel 9 corresponding to one item of the display information 15-17.

Figure 5:
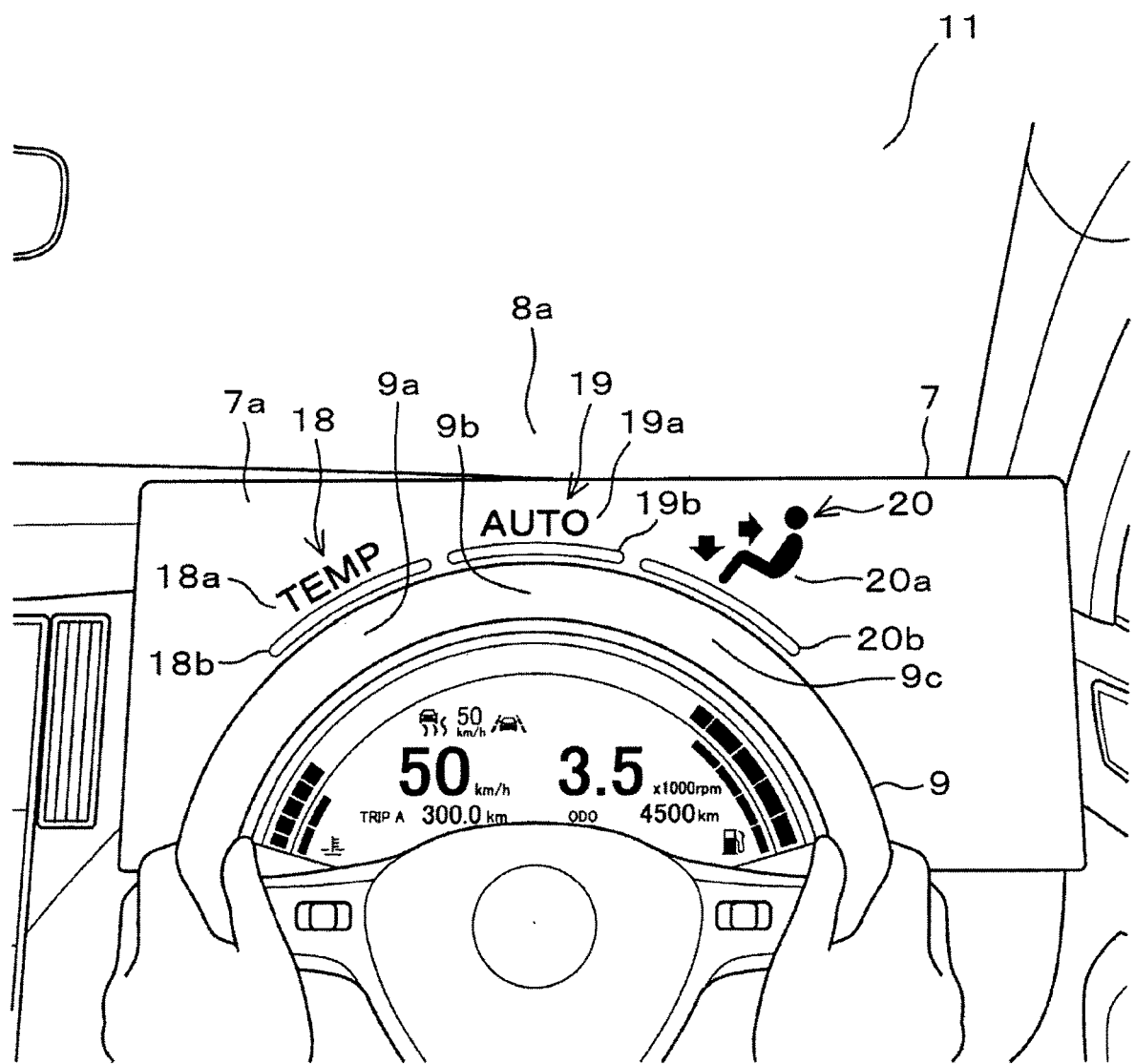
FIG. 5 is a diagram (part 3) showing a display mode of display information.

When the controller 2 determines that the driver hits the periphery around the portion 9b (i.e., a portion along the icon 13b) of the steering wheel 9 corresponding to the display information 13 from the state shown in FIG. 3, the controller 2 determines that the driver selects various settings of the audio device, and switches from the display mode in FIG. 3 to the display mode in FIG. 5. In the display mode of FIG. 5, the controller 2 displays the display information 18 (i.e., the character string 18a of "TEMP" and the icon 18b) indicating the operation of temperature manual setting, the display information 19 (i.e., the character string 19a of "AUTO" and the icon 19b) indicating the operation of the temperature automatic setting, and the display information 20 (i.e., the wind direction image 20a and the icon 20b) indicating the wind direction operation simultaneously. Also in this case, the controller 2 displays the display information 18 to 20 in a display mode along the shape of the steering wheel 9. After that, the driver can perform various settings of the air conditioner device in a stepwise manner by hitting a portion of the steering wheel 9 corresponding to one item of the display information 18-20. Similarly, when the controller 2 determines that the driver hits the vicinity of the portion 9c (i.e., the portion along the icon 14b) of the steering wheel 9 corresponding to the display information 14 from the state shown in FIG. 3, the controller 2 determines that the driver selects various settings for vehicle control.

In such a configuration in which the display information is displayed on the meter display 7, when the posture of the driver changes during driving, the visual line of the driver may be lowered, and the display information may be hidden behind the steering wheel as seen from the visual line of the driver. Accordingly, a difficulty may arise that it takes time for the driver to correct the posture in order to visually recognize the display information. Regarding this point, the controller 2 performs the following control.

Figure 6:
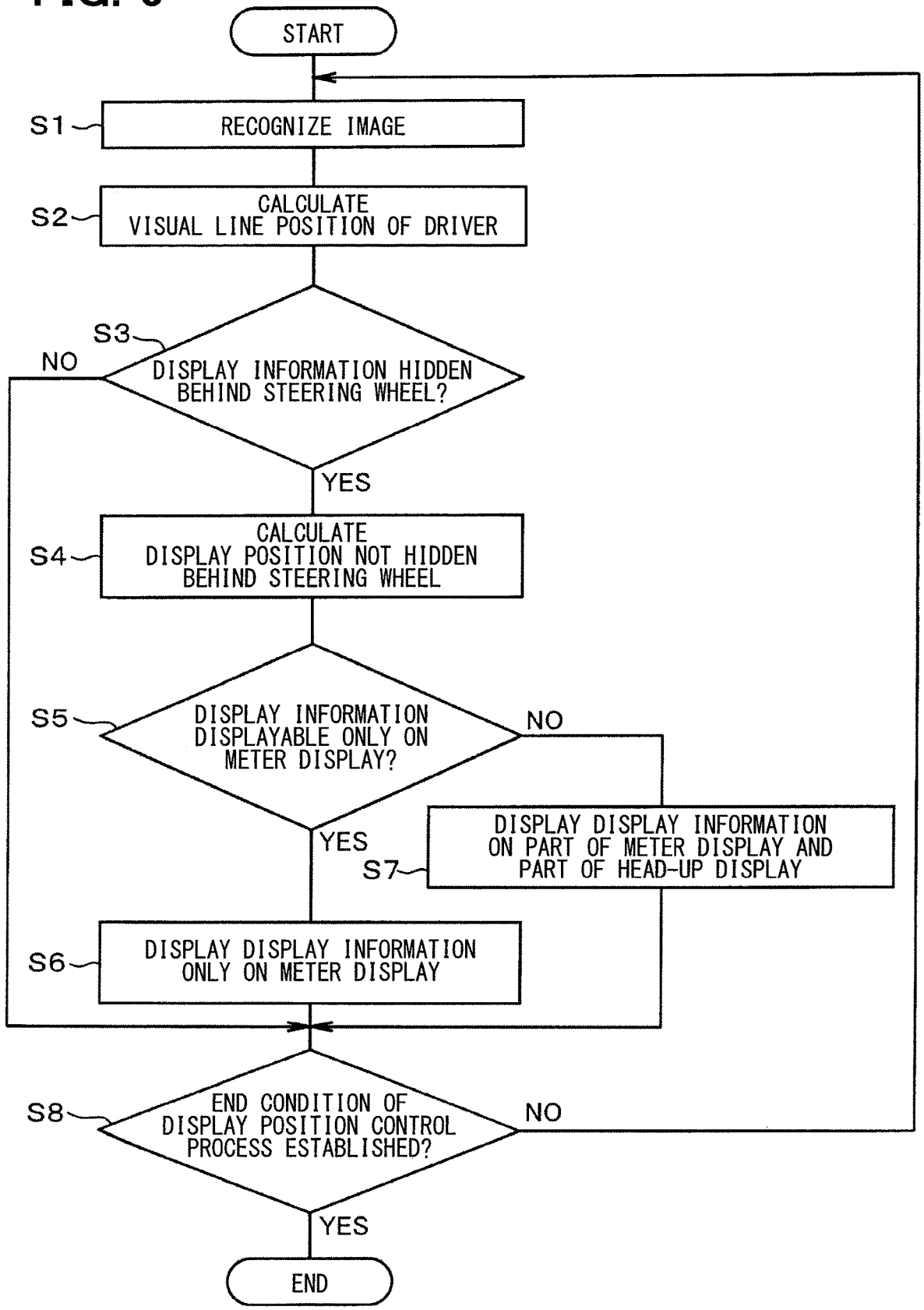
FIG. 6 is a flowchart.

Next, the process of the above configuration will be described with reference to FIGS. 6 to 8. The controller 2 performs a display position control process of controlling the display position of the display information described above according to the visual line of position of the driver. For example, when the display start condition of the display information is satisfied and the display information starts to be displayed, the controller 2 determines that the start condition of the display position control process is satisfied, and starts the display position control process. Upon starting the display position control processing, the controller 2 recognizes the image included in the image signal input from the camera 5, and recognizes the image including the face of the driver photographed by the camera 5 (at S1). Using the recognition result, the controller 2 calculates the face position of the driver, and calculates the visual line position of the driver (at S2, corresponding to the visual line position calculation procedure).

The controller 2 uses the calculation result of the visual line position calculator 2b and the position coordinate data stored in the memory 3, and determines whether the current display position is the display position hidden behind the steering wheel 9 as seen from the visual line of the driver, i.e., whether the display information is hidden behind the steering wheel 9 as seen from the visual line of the driver (at S3). When the controller 2 determines that the display information is not hidden behind the steering wheel 9 as seen from the visual line of the driver (i.e., NO at S3), the controller 2 determines whether the termination condition of the display position control process is satisfied (at S8).

On the other hand, when the controller 2 determines that the display information is hidden behind the steering wheel 9 as seen from the visual line of the driver (i.e., YES at S3), the controller 2 calculates a display position not hidden behind the steering wheel 9 as seen from the visual line of the driver (at S4, corresponding to the display position calculation procedure). The controller 2 checks the width of a predetermined portion of the display information with the width from the upper end portion of the display area 7a of the meter display 7 to the upper end portion of the steering wheel 9, and determines whether all of the display information is displayable only on the display area 7a of the meter display 7 (at S5). When determining that all of the display information is displayable only in the display area 7a of the meter display 7 (i.e., YES at S5), the controller 2 outputs a display command signal to the meter display 7, and displays the display information only on the meter display 7 (at S6, corresponding to the display control procedure).

On the other hand, when the controller 2 determines that all of the display information can not be displayed only in the display area 7a of the meter display 7, a part of the display information needs to be displayed in the display area 7a of the meter display 7, and the remaining part of the display information needs to be displayed in the display area 8a of the head-up display 8 (i.e., NO at S5), the controller 2 outputs a display command signal to the meter display 7 and the head-up display 8 to display the display information on a part of the meter display 7 and a part of the head-up display 8 (at S7, corresponding to the display control procedure).

The controller 2 determines whether the termination condition of the display position control process such as establishment of the display end condition of the display information is satisfied (at S8), and when determining that the termination condition of the display position control process is not established (NO at S8), the process returns to step S1, and repeats from step S1. On the other hand, when the display end condition of the display information is satisfied and the display of the display information is ended, the controller 2 determines that the end condition of the display position control process is satisfied (YES at S8), and ends the display position control process .

By performing the above-described process, the controller 2 controls the display position of the display information as described below. As shown in FIG. 3, when the position of the face of the driver is lowered from the state where the display information 12 to 14 is displayed, and the visual line position of the driver is lowered, the visible range of the driver from the upper end of the display area 7a of the meter display 7 to the upper end of the steering wheel 9 becomes narrower in the vertical direction (i.e., "D1" in FIG. 3>"D2" in FIGS. 7 and 8). Therefore, when the driver's visual line position is lowered, and if the display mode shown in FIG. 3 is maintained, a part of the display information 12 to 14 is hidden behind the steering wheel 9 as shown in FIG. 7.

In contrast, in the present embodiment, when the controller 2 determines that the visual line position of the driver is lowered, and determines that the display information is hidden behind the steering wheel 9 as seen from the visual line position of the driver, the controller 2 calculates the display position which is not hidden behind the steering wheel 9 as seen from the visual line position of the driver. Then, as shown in FIG. 8, the controller 2 displays the display information 12 to 14 at the calculated display position, and changes the display position of the display information 12 to 14, thereby avoiding a situation where a part of the display information 12 to 14 is hidden behind the steering wheel 9. In FIG. 8, the controller 2 determines that all of the display information 12 to 14 can be displayed only in the display area 7a of the meter display 7, and displays the display information 12 to 14 only on the meter display 7.

Figure 7:
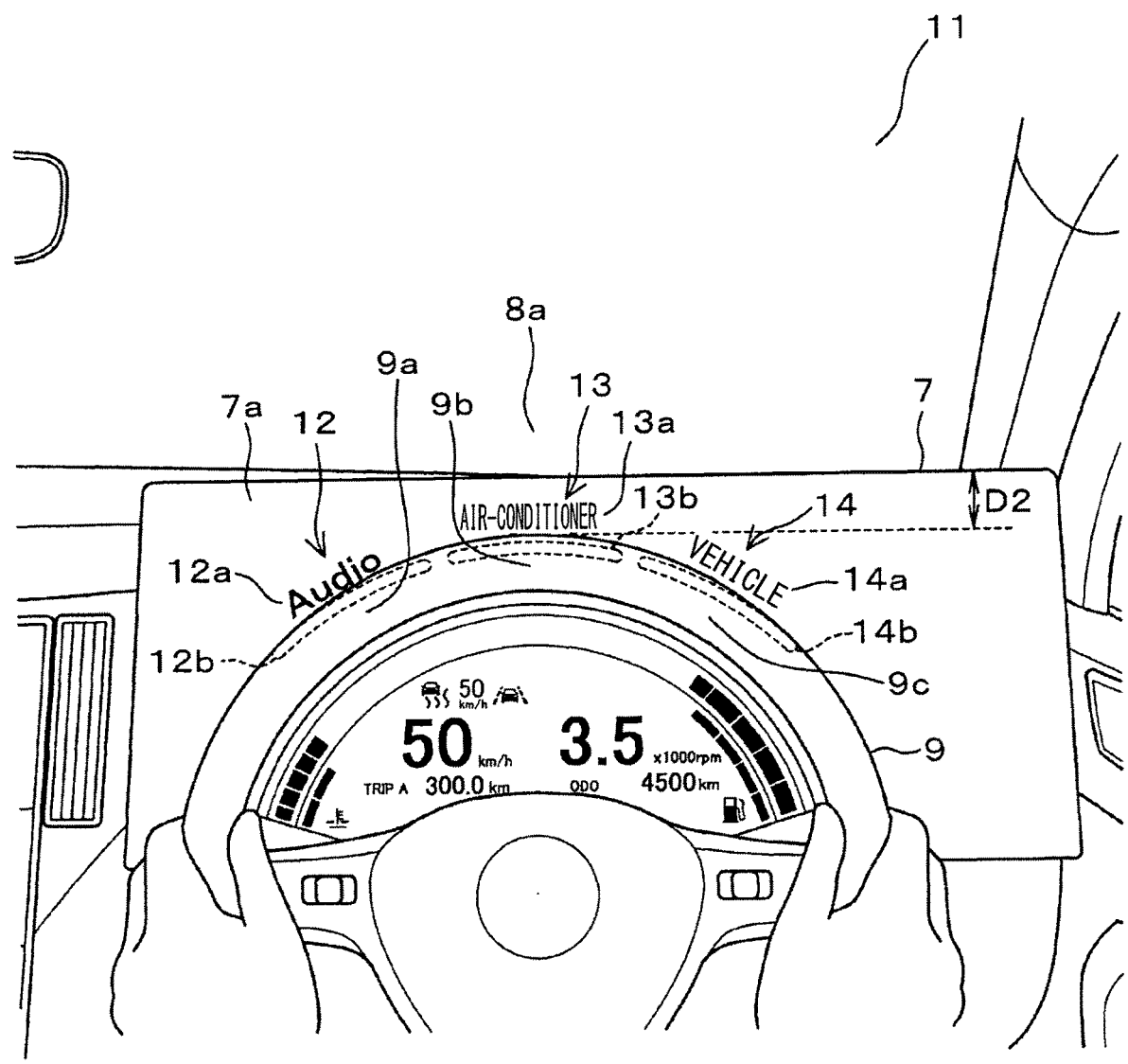
FIG. 7 is a diagram (part 4) showing a display mode of display information.
Figure 8:
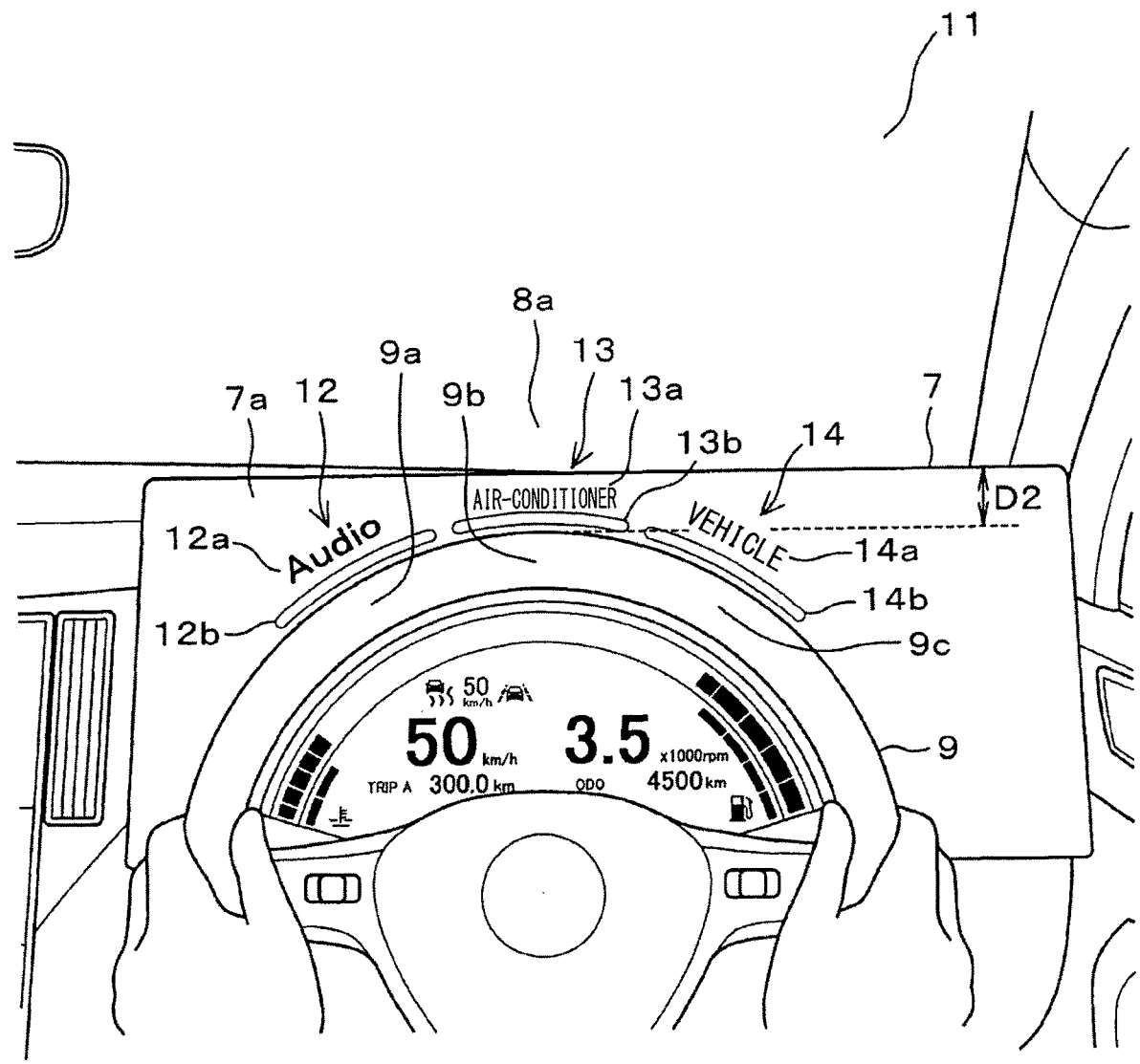
FIG. 8 is a diagram (part 5) showing a display mode of display information.
Figure 9:
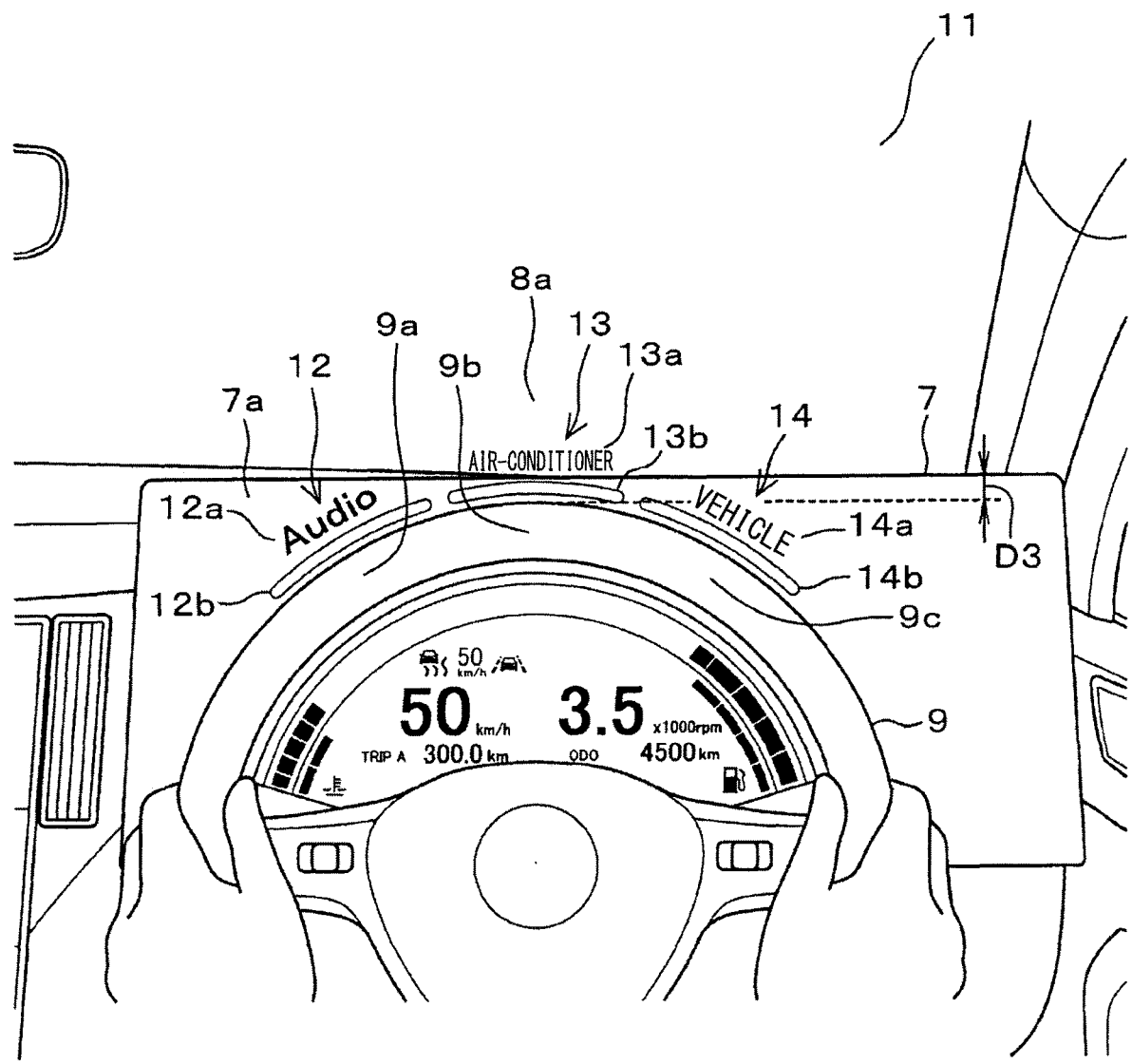
FIG. 9 is a diagram (part 6) showing a display mode of display information.

When the visual line position of the driver is further lowered, the visible range of the driver from the upper end of the display area 7a of the meter display 7 to the upper end of the steering wheel 9 becomes further narrower in the vertical direction (that is, "D2" in FIGS. 7 and 8>"D3" in FIG. 9). Also in this case, when the controller 2 determines that the visual line position of the driver is further lowered, and determines that the display information 12 to 14 is hidden behind the steering wheel 9 as seen from the visual line position of the driver, the controller 2 calculates the display position which is not hidden behind the steering wheel 9 as seen from the visual line position of the driver. Then, as shown in FIG. 9, the controller 2 displays the display information 12 to 14 at the calculated display position, and changes the display position of the display information 12 to 14, thereby avoiding a situation where a part of the display information 12 to 14 is hidden behind the steering wheel 9. In FIG. 9, the controller 2 determines that all of the display information 12 to 14 can not be displayed only in the display area 7a of the meter display 7, and displays the display information 12 to 14 on a part of the meter display 7 and a part of the head-up display 8.

In the above description, the case where the display information 12 to 14 is simultaneously displayed has been described. Similarly, as shown in FIG. 4, when display information 15 to 17 related to various settings of the audio apparatus is displayed at the same time, and, as shown in FIG. 5, and when the display information 18 to 20 related to various settings of the air-conditioner is simultaneously displayed, the above features are applied. Similarly, when two or less pieces of display information are simultaneously displayed, and when four or more pieces of display information are simultaneously displayed, the above features are applied.

Further, the controller 2 may return the display position of the display information to the position before the visual line position of the driver is lowered, when the visual line position of the driver is raised after the visual line position is lowered, and the visual line position of the driver returns to the position before the visual line position is lowered. That is, as shown in FIG. 9, when the position of the face of the driver is raised from the state where the display information 12 to 14 is displayed, and the visual line position of the driver is raised (that is, returned), the visible range of the driver from the upper end of the display area 7a of the meter display 7 to the upper end of the steering wheel 9 widens in the vertical direction. In this case, if the display position of the display information 12 to 14 is left unsolved, the divergence between the display information 12 to 14 and the upper end of the steering wheel 9 becomes relatively large, and there is a possibility that the driver feels discomfort. Thus, the display position of the display information 12 to 14 is returned to the position before the visual line position of the driver is lowered, thereby avoiding a situation that the driver feels discomfort. That is, when the controller 2 determines that the display information is not hidden behind the steering wheel 9 as seen from the visual line position of the driver (NO at S3), the controller 2 determines the distance from the upper end of the steering wheel 9 to the display information 12 to 14. When the controller 2 determines that the distance is equal to or greater than the predetermined distance preliminarily set in advance, the controller 2 determines that the deviation between the display information 12 to 14 and the upper end of the steering wheel 9 is relatively large, and the controller 2 may control to change the display position of the display information 12 to 14 so as to reduce the deviation to be relatively small.

The configuration described in the present embodiment can provide advantages below.

In the vehicle operation system 1, a display position not hidden behind the steering wheel 9 is calculated using the calculation result of calculating the visual line position of the driver and the position coordinate of the steering wheel 9, and the display information indicating the content of the operation on the steering wheel 9 is displayed at the display position. Even when the posture of the driver changes, the driver can properly view and recognize the display information indicating the content of the operation on the steering wheel 9, thereby improving the convenience. That is, the driver can visually recognize a plurality of options appropriately, and can appropriately perform an operation of selecting one of a plurality of options.

When it is determined that all of the display information can be displayed only in the display area 7a of the meter display 7, the display information is displayed only on the meter display 7. On the other hand, when all of the display information is not displayed only in the display area 7a of the meter display 7, the display information is displayed on a part of the meter display 7 and a part of the head up display 8. When the degree of lowering the visual line position of the driver is relatively small, the display information is displayed only on the meter display 7. When the degree of lowering the visual line position of the driver is relatively large, the display information is displayed on a part of the meter display 7 and a part of the head up display 8. Thus, it is possible to flexibly respond to the degree of lowering the visual line position of the driver.

Although the present disclosure has been described in accordance with the embodiments, it is understood that the present disclosure is not limited to the embodiments and structures. The present disclosure may cover various modification examples and equivalent arrangements. Furthermore, various combinations and formations, and other combinations and formations including one, more than one or less than one element may be included in the scope and the spirit of the present disclosure.

A case where a plurality of pieces of display information indicating hierarchical options are displayed in a display manner along the shape of the steering wheel 9 has been exemplified as the display information showing the content of the operation on the steering wheel. For example, it may be applied to the case where the display information indicated by the slide bar on the level of the temperature in the air conditioner or the magnitude of the sound volume in the audio device is displayed in the display mode conforming to the shape of the steering wheel 9. According to such a configuration, the driver can properly visually recognize the magnitude of the sound volume and the level of the temperature, and for example, by sliding the palm along the shape of the steering wheel 9, the driver can properly perform the adjustment operation to control the magnitude of the volume and the level of the temperature.

Although an audio device or an air conditioner device is exemplified as a control target device, a device or a unit etc. connected via an in-vehicle network such as CAN (Controller Area Network) (registered trademark) or MOST (Media Oriented Systems Transport) (registered trademark) may be adopted. That is, for example, an advanced driving support system unit having a lane keep function or the like, an autonomous driving system unit having an automatic accelerator control function, an automatic brake control function or the like may be adopted as a control target device. In addition, as a control target device, an on-vehicle telephone fixedly installed in a vehicle, a simplified mobile phone capable of being brought into a passenger compartment for a driver, or a multifunctional mobile phone defined as a smartphone may be adopted. In case of a cellular phone that can be brought into the passenger compartment for the driver, for example, the cellular phone is connected to the controller 2 via Bluetooth (registered trademark), thereby inputting various signals from the controller 2, and performing various controls.

The invention claimed is:

1. A vehicle operation system for controlling a control target device by performing a predetermined operation of a driver on a steering wheel of a vehicle, the vehicle operation system comprising a processor and memory configured to:
    calculate a visual line position of the driver;
    determine a viewable display area of a meter display that is not hidden behind the steering wheel based on the visual line position of the driver and a position coordinate of the steering wheel, the meter display being positioned on a far side of the steering wheel between the steering wheel and a dashboard of the vehicle and configured to display information corresponding to the predetermined operation of the driver on the steering wheel of the vehicle, and the viewable display area being located between an upper end of the steering wheel and an upper end of the meter display;
    determine whether the viewable display area of the meter display is large enough to display all of the display information corresponding to the predetermined operation of the driver on the steering wheel of the vehicle;
    display all of the display information on only the viewable display area of the meter display in response to determining that the viewable display area of the meter display is large enough to display all of the display information corresponding to the predetermined operation of the driver on the steering wheel of the vehicle; and
    display a first potion of the display information on the viewable display area of the meter display and a second portion of the display information on a head-up display of the vehicle in response to determining that the viewable display area of the meter display is not large enough to display all of the display information corresponding to the predetermined operation of the driver on the steering wheel of the vehicle.

2. The vehicle operation system according to claim 1, wherein:
    the display controller displays at least a portion of the display information in a display manner in a shape corresponding to the steering wheel along the upper end of the steering wheel.

3. The vehicle operation system according to claim 1, wherein the processor and memory are further configured to:
    display a plurality of pieces of the display information having different contents of the operation at a plurality of different display positions.

4. The vehicle operation system according to claim 1, wherein the processor and memory are further configured to:
    recognize an image including a face of the driver photographed by an imaging unit; and
    calculate a face position of the driver using a result of recognizing the image and calculate the visual line position of the driver.

5. A computer-readable non-transitory storage medium comprising instructions being executed by a computer, the instructions including a computer-implemented method for controlling a controller in a vehicle operation system, which performs a control of a control target device by performing a predetermined operation of a driver on a steering wheel of a vehicle, the instructions including:
    calculating a visual line position of the driver;
    determining a viewable display area of a meter display that is not hidden behind the steering wheel based on the visual line position of the driver and a position coordinate of the steering wheel, the meter display being positioned on a far side of the steering wheel between the steering wheel and a dashboard of the vehicle and configured to display information corresponding to the predetermined operation of the driver on the steering wheel of the vehicle, and the viewable display area being located between an upper end of the steering wheel and an upper end of the meter display;
    determining whether the viewable display area of the meter display is large enough to display all of the display information corresponding to the predetermined operation of the driver on the steering wheel of the vehicle;
    displaying all of the display information on only the viewable display area of the meter display in response to determining that the viewable display area of the meter display is large enough to display all of the display information corresponding to the predetermined operation of the driver on the steering wheel of the vehicle;
    displaying a first potion of the display information on the viewable display area of the meter display and a second portion of the display information on a head-up display of the vehicle in response to determining that the viewable display area of the meter display is not large enough to display all of the display information corresponding to the predetermined operation of the driver on the steering wheel of the vehicle.

* * * * *